US007353466B2

(12) United States Patent
Crane et al.

(10) Patent No.: US 7,353,466 B2
(45) Date of Patent: Apr. 1, 2008

(54) SYSTEM AND METHOD FOR GENERATING MESSAGE NOTIFICATION OBJECTS ON DYNAMICALLY SCALED TIMELINE

(75) Inventors: Andrew S. Crane, Seattle, WA (US); Cornelis K. Van Dok, Bellevue, WA (US); Fabrice A. Debry, Bellevue, WA (US); Lyon K. F. Wong, Issaquah, WA (US); Randall K. Winjum, Vashon, WA (US); Timothy P. McKee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 10/855,630

(22) Filed: May 28, 2004

(65) Prior Publication Data

US 2005/0268237 A1    Dec. 1, 2005

(51) Int. Cl.
*G06F 3/00* (2006.01)
*G06F 3/048* (2006.01)
(52) U.S. Cl. .................. 715/963; 715/752; 715/793
(58) Field of Classification Search .............. None
See application file for complete search history.

(56) References Cited

U.S. PATENT DOCUMENTS 5,333,266 A *   7/1994  Boaz et al. ............... 709/206
5,621,874 A *   4/1997  Lucas et al. .............. 715/500
6,539,421 B1 *  3/2003  Appelman et al. ........ 709/206
2003/0158903 A1 *  8/2003  Rohall et al. ............. 709/206

OTHER PUBLICATIONS

Microsoft Outlook 2000. "Microsoft Corp". Published 2000.*

* cited by examiner

*Primary Examiner*—Doug Hutton
*Assistant Examiner*—Soumya Dasgupta
(74) *Attorney, Agent, or Firm*—Shook, Hardy & Bacon LLP

(57) ABSTRACT

A system and related techniques to collect and manage a set of incoming message notification objects, such as instant message notifications, email notifications, download notifications, transaction notifications and others and present those objects to the user with an icon, tile or other representation on a dynamically scaled timeline. According to embodiments, the dynamically scaled timeline may present the most recently received object farthest to the right on a notifications bar or facility and slide objects to the left to represent passage of time as those objects age. Instead of presenting those objects on a linear scale, according to the invention, the time intervals in which objects may be presented may be scaled to cause the oldest message objects to be presented on a relatively compressed dimension. The most recently received messages may be presented on wider intervals, to permit the user to perceive differences in arrival of items more clearly.

47 Claims, 6 Drawing Sheets

SYSTEM AND METHOD FOR GENERATING MESSAGE NOTIFICATION OBJECTS ON DYNAMICALLY SCALED TIMELINE

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of computer communications, and more particularly to a platform for generating and displaying message notification objects such as instant messaging, email or other inbound objects or other remote or local events on a dynamically scaled timeline which presents the most recently received message notifications in an expanded display interval.

BACKGROUND OF THE INVENTION

The proliferation of Internet access and network providers has confronted users with an array of communications, messaging and other services. Users who elect to use or subscribe to communications services or channels may be forced to track a volume of traffic which they receive, in the form for example of instant messaging, email messages, notifications when listed "buddies" come online, download notifications and other messages or notifications. That traffic may arrive at times when the user is away from their computer, is busy with other programs or tasks, when programs or tasks are minimized or otherwise executing in a background mode, or other occasions when the user can not immediately receive, read, act on or respond to the given notice or notices.

In response to that tracking task, technologies have evolved such as those illustrated in FIG. 1 in which a set of message objects may be presented to the user in a unobtrusive, compact form along a notification bar, for instance in a graphical user interface, including for example a task bar or side bar. In such interfaces, a series of messages, alerts, notifications or other messages or objects may be collected in a sliding queue of icons which represent individual notifications as they are received. In cases that sliding queue may place newly received messages or notifications at the left most point in the display section or panel, and as new notification items are received the preceding objects may move to the left or in other directions indicating the uniform passage of time. In this fashion a user may collect and view a set of notifications in order of receipt, at times they choose and without interruption of other tasks.

However, sliding queues for these types of notifications or other objects are not without certain disadvantages. For one, in platforms which deliver a sliding message queue, each message takes a place along the timeline and is moved out along that timeline at points which are evenly spaced according to the date and time which those messages are received. Thus relatively old messages or other objects may extend to the far end of the available notification bar, while new messages drop in at the other end but the temporal relationship between those extremes and messages in between may not be clear to users. For example, the user may not be able to tell from the spacing of the string of message notifications or other objects which items came in within the last hour or day, or which are several days old and therefore more likely to be obsolete. Moreover, on a notifications bar which is generated in a sidebar interface, the number of pixels available to depict the set of objects may not be large. That interface can therefore relatively quickly fill up with notification objects, after which oldest objects may, for example, have to drop off, even when those objects are comparatively recent and the user may still wish to access them.

Further, in known notifications technology the message or other objects which are captured to the notifications bar may simply remain informational in nature. That is, the displayed notification icon may indicate a date and time at which the object was received, but may not be able to be highlighted, selected, hovered over, clicked on or otherwise activated, for instance to reveal a dialog box or other request for input which may, for example, have arrived with or been part of the original underlying object or message. Other problems in current messaging and notification technology exist.

SUMMARY OF THE INVENTION

The invention overcoming these and other problems in the art relates in one regard to a system and method for generating message notification objects on a dynamically scaled timeline, in which incoming messages, notifications or other objects or events may be captured to a notifications facility, for example within a sidebar or other section of a graphical user interface. In embodiments, the notifications facility may order and display the set of message notifications objects in relative order of arrival, but may not display those objects at a linear spacing corresponding to their literal time of arrival. Rather, according to embodiments the inventive platform and methods may generate a dynamically scaled timeline on which message notification objects may be placed. In implementations, those timelines may include a scaling which stretches the portion of the display bar or other interface at the most recent end, so that the temporal relationship or separation between the most recently received message notification objects may be more easily perceived. The intervals between comparatively older message notification objects may in contrast be compressed or compacted, underscoring in one regard that the time separation of the notifications or other objects become less significant as time goes by, for instance after days or a week. In embodiments, as two or more message notification objects begin to touch or overlap along the timeline, those objects may be rearranged into a stack or cascade, to preserve the space on the interface. In further embodiments, two or more stacks of message stacks may be merged as they approach and overlap. In other embodiments, message notification objects, in a stack or out, may be selectable to show attribute data such as date and time of receipt, or other information. Likewise in embodiments, individual message notification objects may be activatable by highlighted, clicking or other action to display a dialog box or other user action which was presented at time of receipt of the original message generating the notification, for instance to ask for a password or other input.

DETAILED DESCRIPTION OF EMBODIMENTS

Figure 1:
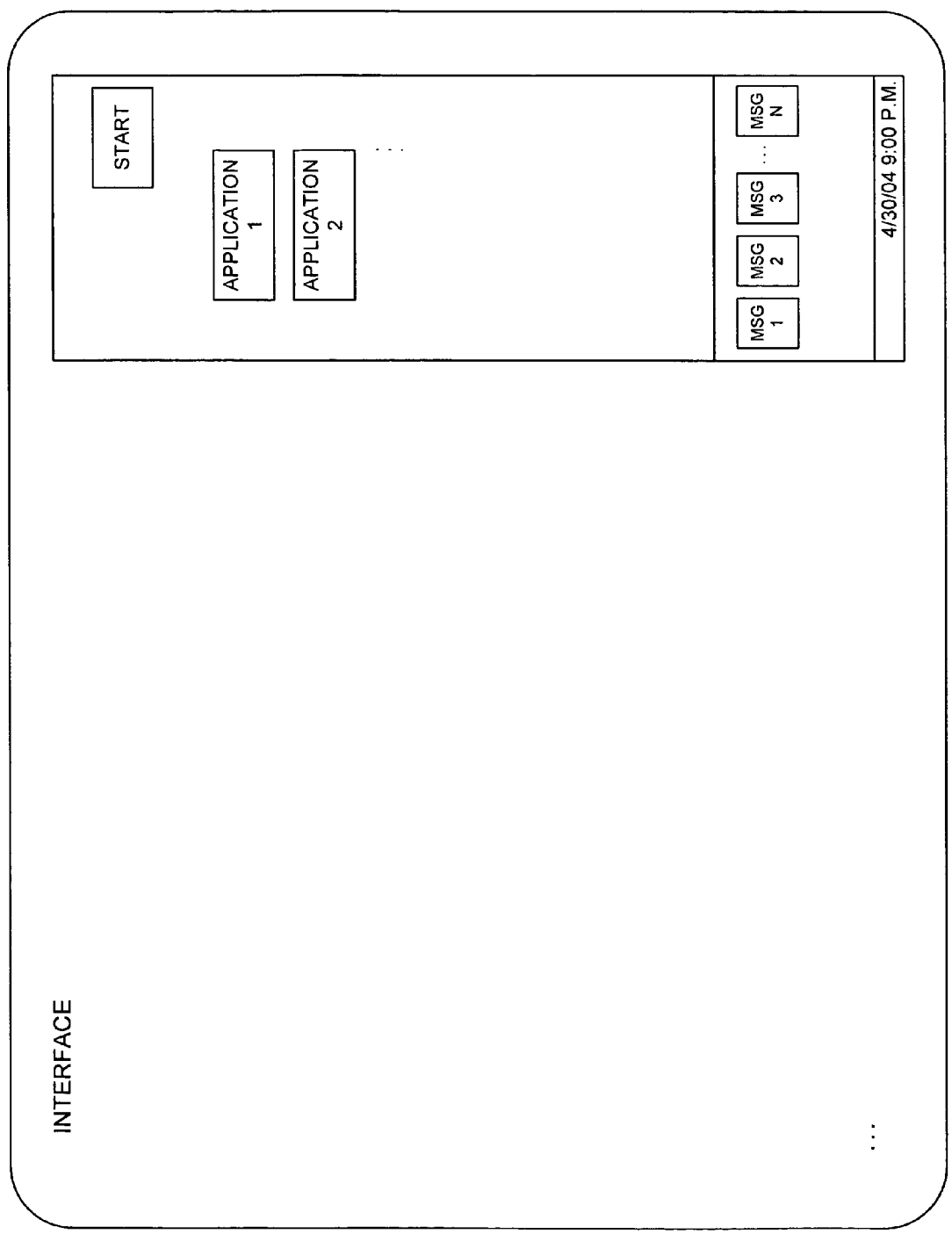
FIG. 1 illustrates a notification display bar.
Figure 2:
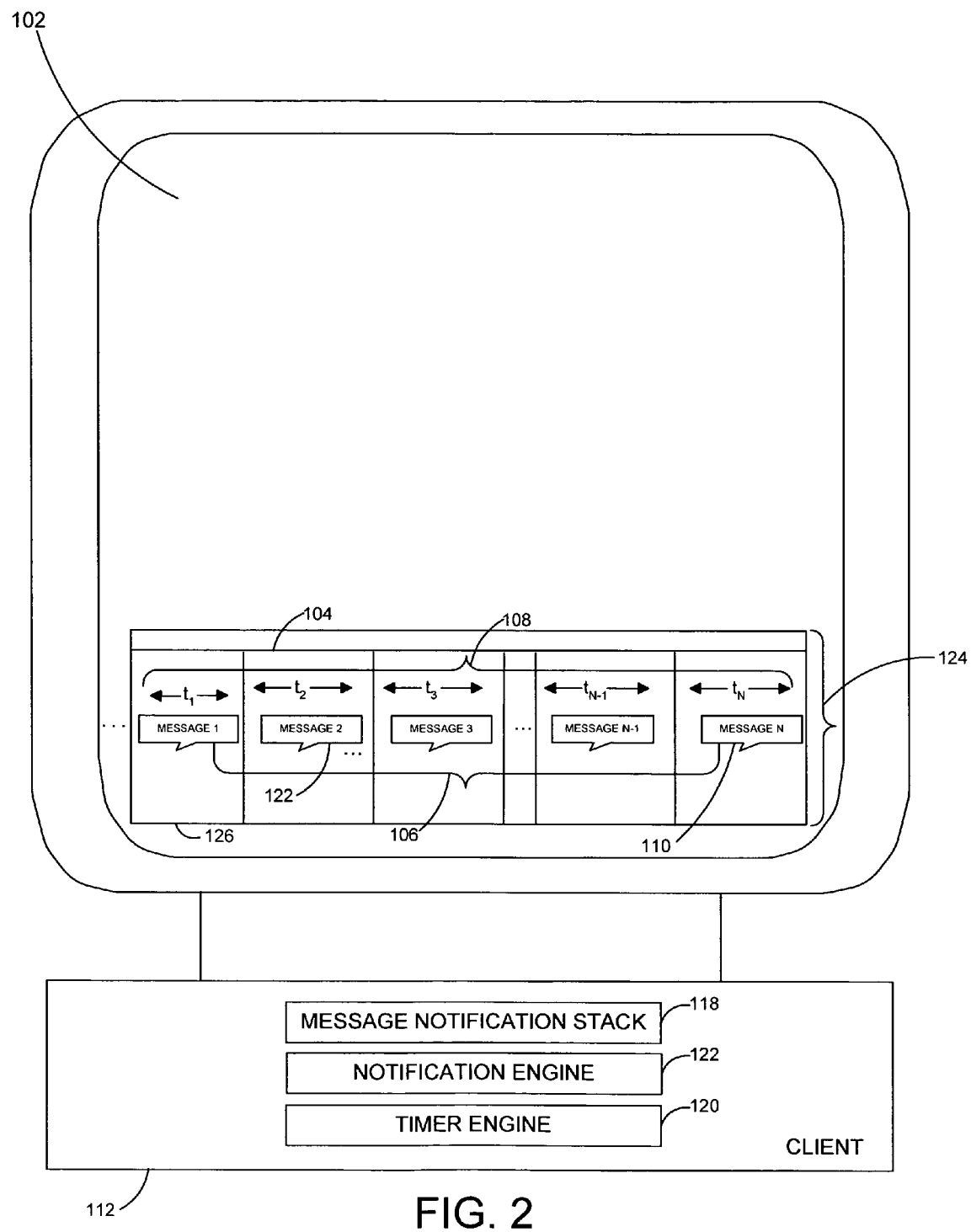
FIG. 2 illustrates a message notification facility including a dynamically scaled timeline, according to embodiments of the invention.

FIG. 2 illustrates an architecture in which a system and method for generating message notification objects on a dynamically scaled timeline may operate, according to an embodiment of the invention. As illustrated in that figure, a user may manipulate a user interface 102, such as a graphical user interface, on a client 112 to perform communications, messaging, browsing and other tasks. According to embodiments as shown, in connection with those communications and other tasks a notification facility 104 may be presented to the user, for example in the form of a section or panel within a sidebar 126 of the user interface 102. According to the invention in one regard, as the user receives or otherwise accesses communications or messaging events, objects or notifications, the notification facility 104 may present the user with a set of message notification objects 106 to alert the user that various events have occurred. The set of message notification objects 106 may include one or more activatable message object 110, for instance in tile, icon or other visual form.

According to embodiments of the invention in one regard, the set of message notification objects 106 may be prompted by or associated with events such as the receipt of an instant messaging type message or invitation, the receipt of an email message, the receipt of a telephone call or a telephone message such as a telephone communication via Voice over Internet Protocol (VoIP) or others, the initiation, suspension or completion of a file or other download, the receipt of a transaction notification such as an indication that an electronic payment has been transmitted or received, a network services or access indication such as an indication of wireless access availability or signal strength, or other notifications, communications, events, objects, messages or data. In embodiments, triggering events and related data may likewise include events taking place, on or messages issued from, client 112 itself. Those may include for example alerts or messages related to resources of client 112 such as a low-battery notification, a pending reboot notification, a system update notification, a memory error notification or other local events, objects, messages or data.

According to embodiments of the invention in one regard, the set of message notification objects 106 may be detected and captured by a notification engine 124, which engine may include communications and presentation logic, for example incorporated within an operating system or other resources, to generate and manage notification facility 104. According to the invention in one regard, the notification engine 124 may for instance detect messaging or other events via a notification application programming interface (API), or other notification services or resources, for example incorporated in the operating system of client 112.

In embodiments of the invention as shown, the set of message notification objects 106 may be displayed to the user along a timeline 128 within the notification facility 104. Timeline 128 may contain a set of dynamically scaled intervals 108, illustratively labeled $t_1, t_2, t_3 \ldots t_{N-1}, t_N$. According to embodiments of the invention in one regard, one or more activatable message object 110 may be presented in each interval of the set of dynamically scaled intervals 108, which intervals may be sequenced to indicate or represent a time frame at which each message object placed in that interval was received. According to embodiments, the most recently received or accessed object may be detected and inserted in the right-most extreme of timeline 108, and be moved according to the passage of time in a leftward direction. In other embodiments, the direction of flow may be left to right, up/down or down/up, or otherwise. In embodiments, the receipt of an activatable message object 110 may likewise be accompanied by an audible output, such as a bell sound or other output. In further embodiments, the user may choose to manually apply a "do not disturb" period during which, for example, no activatable message object 110 may be permitted to be displayed. According to embodiments in another regard, no activatable message object 110 may be displayed until receipt or occurrence of a first or new message, notification, or other event after a period of inactivity or do not disturb interval. This may be the case for example when no messages have been received or other action taken for longer than the maximum interval tracked by the invention, clearing all displayed message objects.

The total window or span of time encompassed by the range from $t_1$ to $t_N$ may be fixed or may vary, for example, according to the portion of the user interface 102 allocated to the notification facility 104 or a maximum number of permitted message objects, or be based on other parameters or inputs. According to embodiments in one regard, illustratively that total span may equal minutes or hours, a day, several days, a week, a month or other amounts of time over which the capture and collection of notification objects may be desirable or useful to the user.

According to embodiments of the invention in one regard, the pixel or other width of each of the set of dynamically scaled intervals 108 may not necessarily be set to an equal or strictly linear spacing. That is, according to the invention the pixel or other width of each of the illustrative intervals $t_1, t_2, t_3 \ldots t_{N-1}, t_N$ may not simply be set by dividing the total window of time from $t_1$ to $t_N$ by the number of intervals, and set the pixel width or position for each interval proportionately. Instead, according to embodiments the pixel width or position of each of the illustrative intervals $t_1, t_2, t_3 \ldots t_{N-1}, t_N$ in the set of dynamically scaled intervals 108 may be generated according to function which allocates different representative widths or positions to those intervals, based in part on their age. Or to express the varying scale another way, a window having a fixed pixel width may encompass differing time intervals, depending on the amount of time that has transpired since those intervals.

Thus in one regard, the oldest interval $t_1$ may for example represent or incorporate all message objects in the set of message objects 106 which were received more than 5 days ago. That interval or position may be set to a relatively far position or, conversely, compressed pixel width, for example 15 pixels wide at the end of timeline 128, so that the corresponding one or more activatable message object 110 dated from more than 5 days ago is moved to that location after that amount of time. Because the scale and/or location of that interval is compressed, the message notification object or objects contained in that interval will not move much or at all thereafter.

In contrast, the most recent interval $t_N$ containing the one or more activatable message object 110 which has been most recently received may be allocated a comparatively larger proportion of the pixel width of timeline 128, for example 40 pixels, and begin at the first available pixel position. Intermediate intervals may be allocated a successively smaller number of pixels, or moved to positions separated by successively smaller distances, resulting in objects which move by successively finer amounts over time. For example, intervals which are more than 1 hour or 1 day old may be scaled according to a function such as a square root or other function which reduces the position or displayed width according to a square root of the total elapsed time between the present time and that interval. Other functions which reduce or lessen the perceived visual change as the input time values become larger may be used. According to embodiments in one regard, an illustrative width scaling function may for example be expressed as:

$$\text{Pixel\_Width}(\text{Interval}(x)) = \{1/\text{ElaspsedTime}(\text{Interval}(x))\} * \text{Pixel\_Width}(t_N). \quad \text{Equation 1}$$

Alternatively or in addition, the absolute position of the interval for a given interval reflecting a later time (x) along timeline 128 may be generated by a scaling function such as:

$$\text{Pixel\_Position\_Interval}(x) = \text{Pixel\_Position}(0) + \text{Square\_Root}\{(\text{Time\_Elapsed}(x)/\text{Total\_Interval\_Shown})\}, \quad \text{Equation 2}$$

which has the effect of gradually slowing down the speed by which an interval progresses along timeline 128, as that interval ages. Other functions or expressions may be used. According to scaling actions according to the invention, the spatial separation between message notification objects which are recently received may therefore be greater than the spatial separation between message notification objects which have been received comparatively less recently.

According to the invention in one regard, therefore, the user may be presented with a visual experience in notification facility 104 whereby recent message notification objects and the separation between those objects are highlighted or made more readily viewed or interpreted compared to less recently received objects. This may be in accord with the experiences or preferences of some users who may wish to focus attention on more recent rather than potentially dated or obsolete message notification objects. The most recent message notification objects may in one regard relate to more urgent, recent or accurate or up-to-date events which the user may wish to review or respond to, as appropriate.

According to embodiments of the invention in another regard, each object in the set of message notification objects 106 may be represented in notification facility 104 by way of an icon, tile or other graphical or other representation which corresponds to a category, type or other attribute of that object. For example, an activatable message object 110 in the set of message notification objects 106 which represents the receipt of an email message may be presented in the form of an icon depicting a mail box with an envelope inside. An activatable message object 110 representing a telephone message or call may for example be presented in the form of a handset icon. Other graphical, iconic or other representations are possible, which may also be generated or applied according to rules other than object type, in cases.

Figure 3:
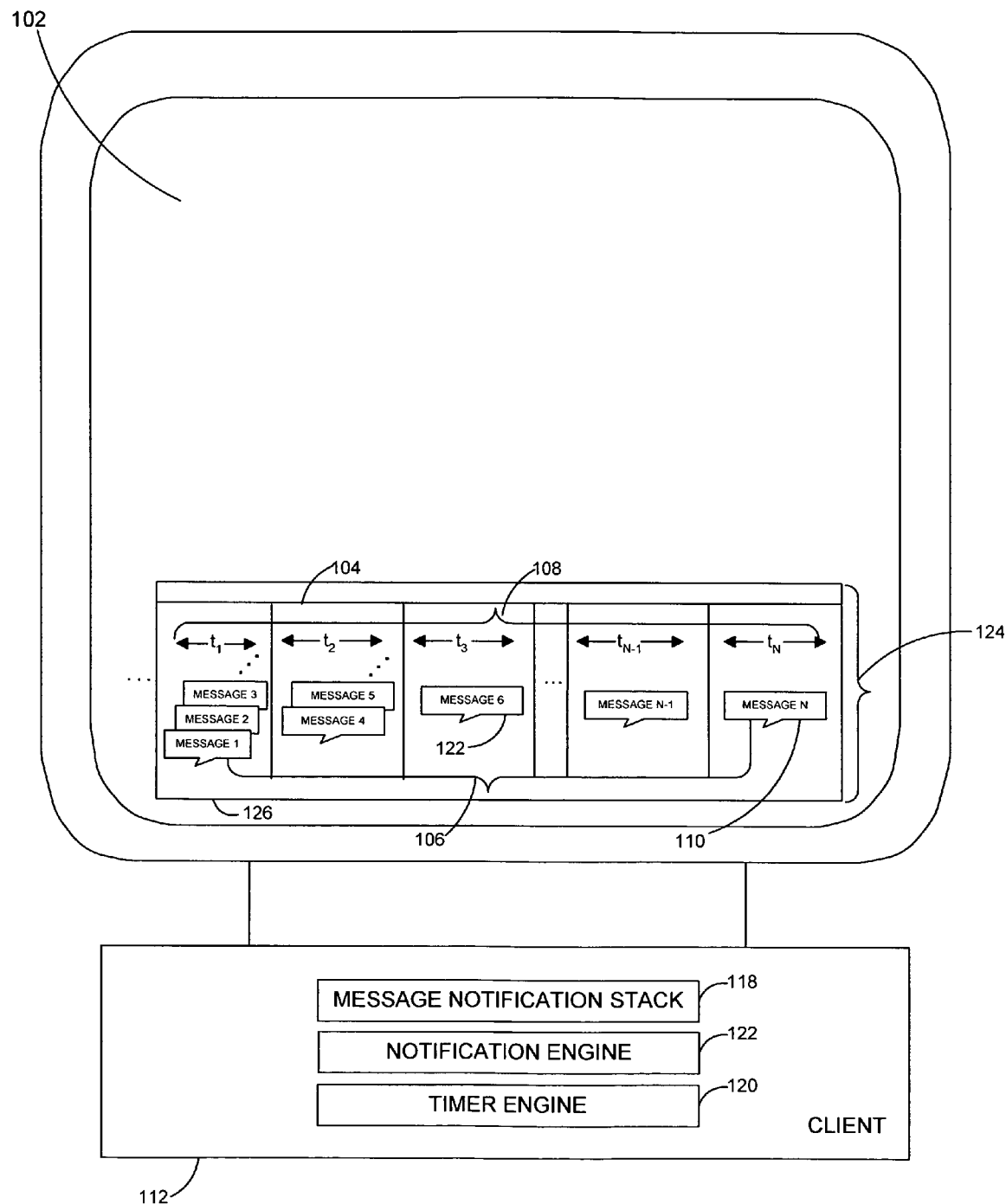
FIG. 3 illustrates a message notification facility including a dynamically scaled timeline and stacked message objects, according to embodiments of the invention.

FIG. 3 illustrates a notification facility 104 having a set of dynamically scaled intervals 108, according to embodiments of the invention in another regard. According to embodiments as shown, as one or more activatable message object 110 slides along timeline 128, at some point the pixel position or occupied interval of two or more message notification objects may begin to overlap. To reduce interface clutter and present the set of message notification objects 106 in more compact form, therefore, according to embodiments of the invention the notification engine 124 may detect the overlap and generate a message notification stack 118 which combines two or more activatable message objects 110 into a stacked or cascaded visual icon, as shown. More than one message notification stack 118 may be generated and displayed along timeline 128, as shown, depending on how many activatable message objects 110 are present in the set of message notification objects 106, and the timing of receipt of those objects, among other factors.

The depth of each message notification stack 118 and number of objects therein may be extended to the available pixel limits of the notification facility 104 within sidebar 126, or fixed at other limits. The individual activatable message objects 110 which are absorbed and regenerated in message notification stack 118 may be ordered within the stack according to the time of receipt, or otherwise. The message notification stack 118 once formed may slide or progress along timeline 128 according to a set of dynamically scaled intervals 108, in the same manner as individual activatable message objects 110. Activatable message objects 110 may be added to an existing message notification stack 118, when those objects impinge on the interval or position of that stack.

Figure 4:
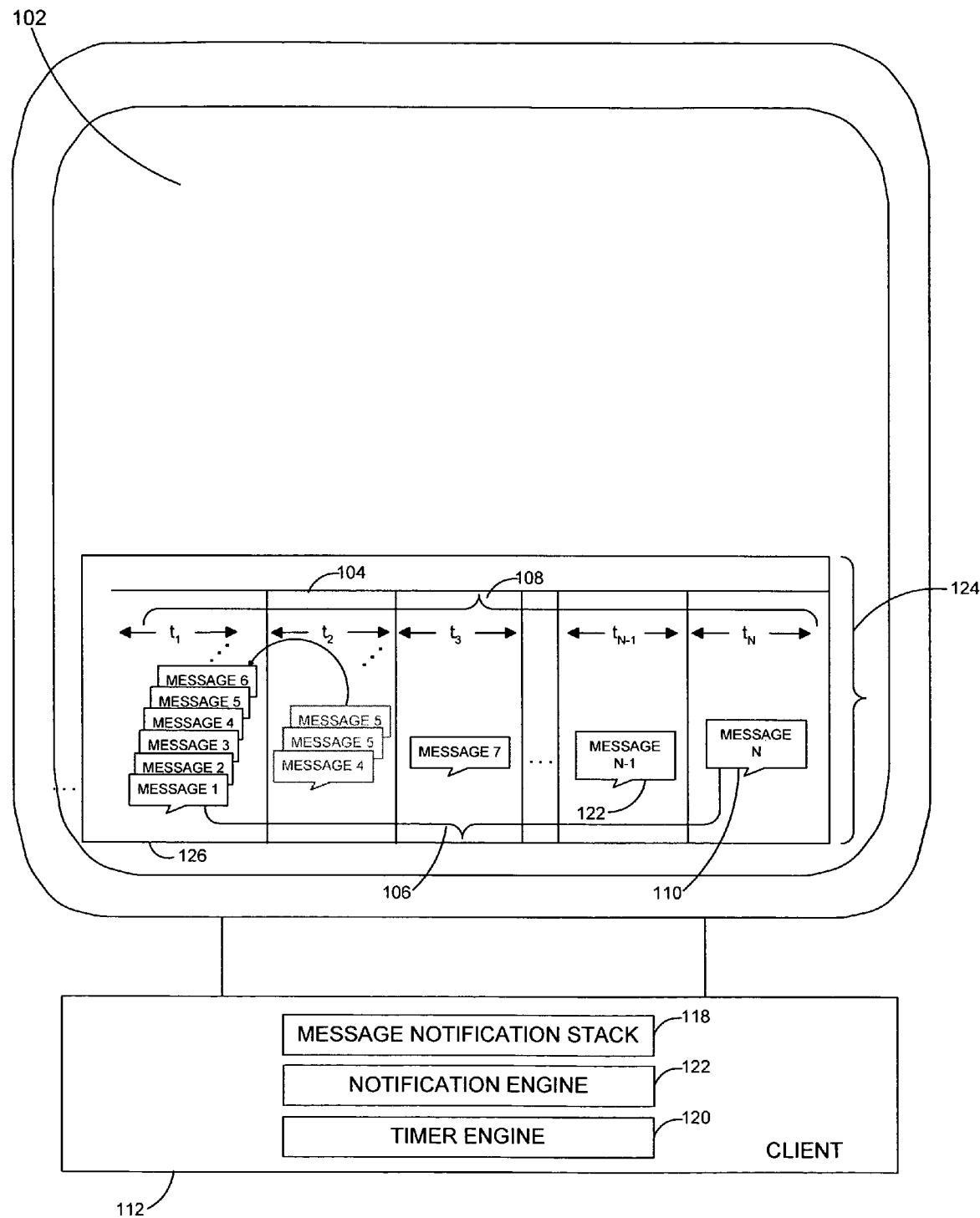
FIG. 4 illustrates a message notification facility including a dynamically scaled timeline and showing a stack merger operation, according to embodiments of the invention.

FIG. 4 illustrates a notification facility 104 for automatically displaying message notification objects, according to the invention in a another regard. As shown in this figure, in embodiments and environments in which more than one message notification stack 118 is generated, notification engine 124 may likewise monitor or detect the overlap of the position of two or more message notification stacks 118 as they age and move along timeline 128. According to embodiments as illustrated, those message notification stacks 118 may themselves be reconfigured and regenerated as a merged message notification stack 118 which absorbs all individual activatable message objects 110 contained in the preceding stacks. According to embodiments in one regard, those activatable message objects 110 may be ordered in order of the time of receipt in the merged message notification stack 118, or otherwise.

Figure 5:
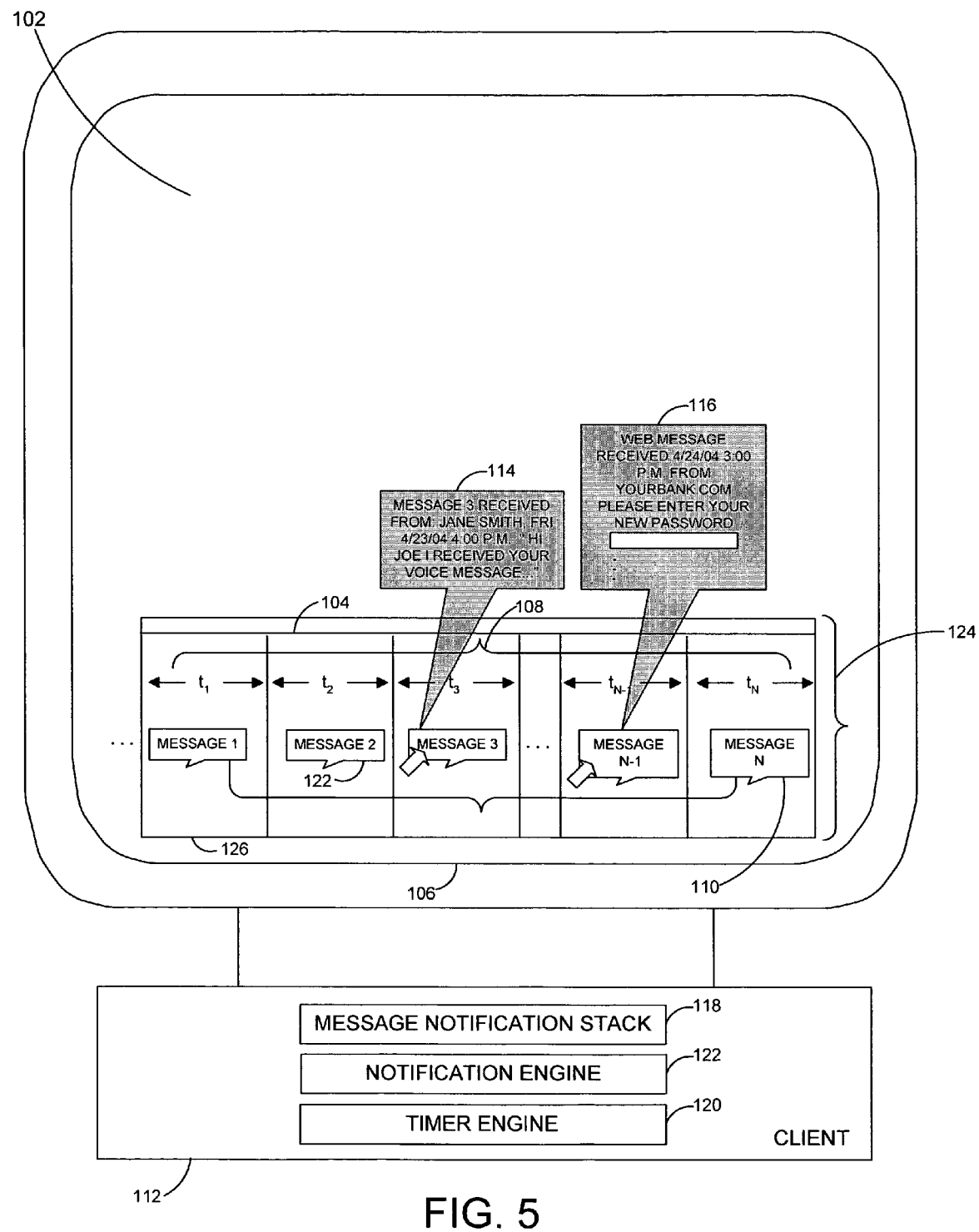
FIG. 5 illustrates a message notification facility including a dynamically scaled timeline and showing activatable attribute displays and dialog boxes, according to embodiments of the invention.

FIG. 5 illustrates a notification facility 104 for automatically displaying message notification objects, according to the invention in a another regard. As shown in this figure, in embodiments the one or more activatable message objects 110, stacks or other resources in the set of message notification objects 106 may be selected or highlighted by a user, to generate the popup or other display of further information related to the underlying message notification event.

According to embodiments as shown, a user may highlight, hover over or otherwise select an activatable message object 110, which object may respond by generating popup message attributes 114 which may be displayed within or by the notification facility 104, for example in a text panel. According to embodiments, the popup message attributes 114 may include data associated with the original message notification event which triggered the activatable message object 110 which is being highlighted or selected. For example, the popup message attributes 114 may contain or present data such as the date and time of receipt of an original message notification, the user or other source of that message notification, an indication of attached or downloaded files, confirmation of transaction information such as an electronic payment, the content of an original instant messaging, email or other communication, or other information. In further embodiments, selection or activation may cause the generation of sound output, such as an audible text-to-speech conversion of the attribute data so that the user may hear that information read out as they select the activatable message object 110. Other audible output is possible.

According to embodiments of the invention in one regard, a user may have the option of deleting, hiding or logging the activatable message object 110 before or after they have viewed any popup message attributes, or the activatable message object 110 may automatically be removed, hidden or logged to a history log or file after the popup message attributes 114 are selected or viewed.

According to embodiments illustrated in FIG. 5 in further regard, upon selection and clicking or other activation of one or more activatable message object 110, the notification facility 104 may likewise generate and present a reactivated dialog box 116, which may present a query or option to the user to enter or select data which was queried at the time of receipt of the original message notification object. For example, the reactivated dialog box 116 may present an input box for the user to enter a password, for instance in response to accessing an email message, embedded URL or other resource.

The reactivated dialog box 116 may likewise present the user with options, inputs or other selections associated with an original notification event, such as the choice to record an electronic transaction to a personal finance program, or save an email address to a contact list. Other dialogs, inputs and interactions are possible. According to the invention in a further regard, the user may in embodiments likewise be given an objection to delete, move, hide or log an activatable message object 110 which has been selected and activated to generate reactivated dialog box 116. In embodiments such message objects may alternately be automatically deleted, hidden or removed, or logged to a log or history file.

Figure 6:
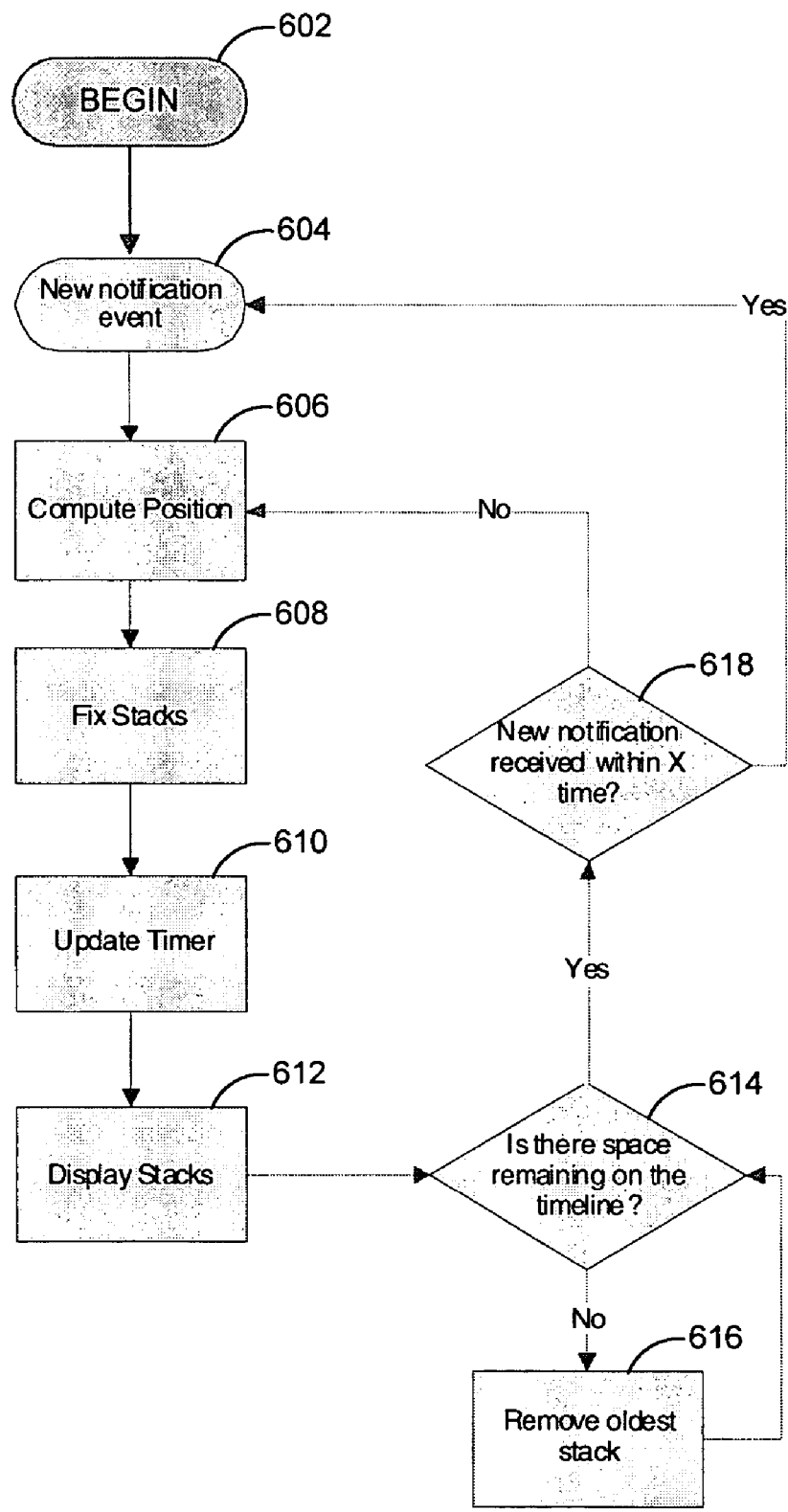
FIG. 6 illustrates a flowchart of overall message notification processing, according to embodiments of the invention.

FIG. 6 illustrates overall notification and timeline processing, according to embodiments of the invention. In step 602, processing may begin. In step 604, a new notification event may be detected or captured, such as the arrival of an instant message, the arrival of an email message, the detection of a listed ("buddy" or other) user logging online, the arrival of a telephone message, telephone call (e.g. Voice Over IP or other), facsimile document, a message or notification indicating the beginning, suspending, termination or other aspect of a file or other download, a networked services notification such as the availability or signal strength of a wireless or other connection, or other event, message, notification or other object or information. In step 606, the position of the new message notification in the set of message notification objects 106 may be computed, for instance along the timeline depicted by the notification facility 104. In step 608, the set of positions for one or more message notification stack 118 and/or one or more activatable message object 110 may be computed to allow for the rearrangement of those objects along the timeline of notification facility 104, to accommodate the new message notification object.

In step 610, the timer engine 120 may be updated, for example to compute or update the interval of time at which event notification services may be checked or polled to determine whether a new message event has occurred, for instance as in the determination made in step 618 below. In step 612, the one or more message notification stack 118 along with one or more activatable message object 110 in the set of message notification objects 106 may be displayed in the timeline of notification facility 104, for example in a sidebar of user interface 102 or otherwise. In step 614, the notification engine 124 may determine whether any space remains on the timeline of the notification facility 104.

If the determination in step 614 is that space does remain, processing may proceed to step 618, where a determination may be made whether a new notification object or event has been received within a predetermined time, which time may be set or configured by a fixed interval such as 1 minute, 15 minutes, 1 hour or other intervals, by a user-selectable interval, by a network-administered interval, or by other intervals or times.

If the ensuing determination in step 618 is that a new message notification or other event or object has been received within a predetermined time, processing may return to step 604 where the new notification event or object may be captured. If the determination in step 618 is that a new message notification or other event or object has not been received within the predetermined time, processing may return to step 606 where new positions or coordinates for the set of message notification objects 106 may be computed.

If the determination in step 614 is that no space remains on the timeline of notification facility 104, processing may proceed to step 616 in which the oldest message notification stack 118 may be removed, deleted or hidden. Processing may then return to step 614, for an updated determination of whether displayable space remains on the timeline of the notification facility 104.

The foregoing description of the invention is illustrative, and modifications in configuration and implementation will occur to persons skilled in the art. For instance, while the invention has generally been described in terms of a single timeline along which message notification objects and related data may be presented, in embodiments multiple timelines may be displayed, for example separate timelines for each of separate types of messages, events or other notifications or objects.

Similarly, while the invention has in embodiments been described as involving notifications received by a single user operating a client or other machine, in embodiments one or more messages or other objects in the set of message notification objects 106 may be shared or redirected to other users, services or other destinations. Other hardware, software or other resources described as singular may in embodiments be distributed, and similarly in embodiments resources described as distributed may be combined. Further, while the invention has generally been described in terms of a right-to-left progression along a straight ordinal line, in embodiments flow in other directions, or along other paths may be used. The scope of the invention is accordingly intended to be limited only by the following claims.

We claim:

1. A method for generating message notification objects on a dynamically scaled timeline, comprising:
   receiving a set of message notification objects; and
   generating a dynamically scaled timeline to display the set of message notification objects on an output display, the dynamically scaled timeline including a first spatial separation between at least two message notification objects that are recently received and a second spatial separation between at least two message notification objects received less recently, wherein the first spatial separation is greater than the second spatial separation, and wherein the dynamically scaled timeline is also configured to generate a message notification stack combining at least two message notification objects into a cascaded visual icon.

2. A method according to claim 1, further comprising communicating the set of message notification objects to a display device to display on the dynamically scaled timeline.

3. A method according to claim 2, further comprising presenting the set of message notification objects in a notification facility in a graphical user interface on the display device.

4. A method according to claim 3, wherein the notification facility is displayed in a sidebar of the graphical user interface.

5. A method according to claim 1, wherein the set of message notification objects comprise at least one of an instant messaging notification object, an email notification object, an online user notification object, a network service notification object, a download notification object, a telephone notification object, a transaction information notification object and a client resource notification object.

6. A method according to claim 1, wherein the receiving comprises communicating with a communications service to receive the set of message notification objects.

7. A method according to claim 6, wherein the communications service comprise at least one of services provided by an internet service provider and services provided via a local area network.

8. A method according to claim 1, wherein the dynamically scaled timeline comprises a set of intervals.

9. A method according to claim 8, further comprising scaling each of the set of intervals as a function of the amount of time since a corresponding one of the message notification objects has been received.

10. A method according to claim 9, wherein the function comprises a function which is proportional to the square root of a difference between each of the set of intervals and the present time.

11. A method according to claim 1, further comprising stacking at least two of the set of message notification objects into a message notification stack when their scaled intervals overlap.

12. A method according to claim 11, wherein at least two sets of at least two message notification objects are stacked into at least two message notification stacks, further comprising merging at least two message notification stacks when their scaled intervals overlap.

13. A method according to claim 1, further comprising displaying attribute data associated with at least one of the set of message notification objects when selected by a user.

14. A method according to claim 1, further comprising reactivating a dialog activity generated when the message was originally received upon activation of at least one message notification object by a user.

15. A method according to claim 1, wherein no message notification object is generated for display until at least the occurrence of a new message notification event after at least one of a period of inactivity and a user-selected do not disturb period.

16. A method according to claim 1, wherein at least one of the set of message notification objects comprises a representative icon corresponding to a message type of the at least one message notification object.

17. A method according to claim 1, further comprising generating a sound output based upon receipt or selection of at least one of the set of message notification objects.

18. One or more computer readable media embodying a selectable message notification object generated for display on a timeline, comprising:

a representation of the message notification object; and
a set of data associated with the representation of at least a portion of the message notification object, the set of data being accessible for display at least upon selection of the representation by a user,
wherein the message notification object is represented on a dynamically scaled timeline, the dynamically scaled timeline including a first spatial separation between at least two message notification objects that are recently received and a second spatial separation between at least two message notification objects received less recently, wherein the first spatial separation is greater than the second spatial separation, and wherein the dynamically scaled timeline is also configured to generate a message notification stack combining at least two message notification objects into a cascaded visual icon.

19. A message notification object according to claim 18, wherein the set of data associated with the representation comprises attribute data.

20. A message notification object according to claim 19, wherein the attribute data comprises at least one of date data, time data, message type data, message content data, message source data, download data, transaction data and network service data.

21. A message notification object according to claim 18, wherein the set of data associated with the representation comprises an activatable input dialog.

22. A message notification object according to claim 18, wherein the message notification object comprises a representative icon corresponding to a message type of the message notification object.

23. A system for generating message notification objects on a dynamically scaled timeline, comprising:

input means for receiving a set of message notification objects;
display engine means, the display engine means communicating with the input means to receive the message notification objects and generate a dynamically scaled timeline to display the message notification objects, the dynamically scaled timeline including a first spatial separation between at least two message notification objects that are recently received and a second spatial separation between at least two message notification objects received less recently, wherein the first spatial separation is greater than the second spatial separation, and wherein the dynamically scaled timeline is also configured to generate a message notification stack combining at least two message notification objects into a cascaded visual icon; and
output means, the display engine means communicating the set of message notification objects to a display device via the output means to display on the dynamically scaled timeline.

24. A system according to claim 23, wherein the set of message notification objects comprise at least one of an instant messaging notification object, an email notification object, an online user notification object, a network service notification object, a download notification object, a telephone notification object, a transaction information notification object and a client resource notification object.

25. A system according to claim 23, wherein the dynamically scaled timeline comprises a set of intervals.

26. A system according to claim 25, wherein each of the set of intervals are scaled as a function of the amount of time since a corresponding one of the message notification objects has been received.

27. A system according to claim 23, wherein at least two of the set of message notification objects are stacked into a message notification stack when their scaled intervals overlap.

28. A system according to claim 27, wherein at least two sets of at least two message notification objects are stacked into at least two message notification stacks, and the at least two message notification stacks are merged when their scaled intervals overlap.

29. A system according to claim 23, wherein attribute data associated with at least one of the set of message notification objects is displayed upon selection by a user.

30. A system according to claim 23, wherein at least one of the set of message notification objects is configured to reactivate a dialog activity generated when the message was originally received upon activation by a user.

31. A system according to claim 23, wherein at least one of the set of message notification objects comprises a representative icon corresponding to a message type of the at least one message notification object.

32. A system for generating message notification objects for display on a dynamically scaled timeline, the system including a processor and one or more computer-readable media, comprising:
an input interface to receive a set of message notification objects, the message notification objects including at least one of an identification of receipt of a communications event, and an identification of a client computer event;
a display engine, the display engine communicating with the input interface to receive the message notification objects and generate a dynamically scaled timeline to display the message notification objects, the dynamically scaled timeline including a first spatial separation between at least two message notification objects that are recently received and a second spatial separation between at least two message notification objects received less recently, wherein the first spatial separation is greater than the second spatial separation, and wherein the dynamically scaled timeline is also configured to generate a message notification stack combining at least two message notification objects into a cascaded visual icon; and
an output interface, the display engine communicating the set of message notification objects to a display device via the output interface to display on the dynamically scaled timeline.

33. A system according to claim 32, wherein the set of message notification objects comprise at least one of an instant messaging notification object, an email notification object, an online user logon notification object, a network service notification object, a download notification object, a telephone notification object, a transaction information notification object and a client resource notification object.

34. A system according to claim 32, wherein the input interface communicates with a communications service to receive the set of message notification objects.

35. A system according to claim 34, wherein the communications service comprises at least one of services provided by an internet service provider and services provided via a local area network.

36. A system according to claim 32, wherein the dynamically scaled timeline comprises a set of intervals.

37. A system according to claim 36, wherein each of the set of intervals are scaled as a function of the amount of time since each of a corresponding one of the message notification objects has been received.

38. A system according to claim 37, wherein the function comprises a function which is proportional to the square root of a difference between each of the set of intervals and the present time.

39. A system according to claim 32, wherein the display device comprises a monitor.

40. A system according to claim 32, wherein the message notification objects are presented in a notification facility in a graphical user interface on the display device.

41. A system according to claim 40, wherein at least two of the set of message notification objects are stacked into a message notification stack when their scaled intervals overlap.

42. A system according to claim 41, wherein at least two sets of at least two message notification objects are stacked into at least two message notification stacks, and the at least two message notification stacks are merged when their scaled intervals overlap.

43. A system according to claim 40, wherein the dynamically scaled timeline is displayed in a sidebar of a user interface.

44. A system according to claim 32, wherein attribute data associated with at least one of the message notification objects is displayed upon selection by a user.

45. A system according to claim 32, wherein at least one of the set of message notification objects is configured to reactivate a dialog activity generated when the message was originally received, upon activation of the at least one message notification object by a user.

46. A system according to claim 32, wherein no message notification object is generated for display until at least the occurrence of a new message notification after at least one of a period of inactivity and a user-selected do not disturb period.

47. A system according to claim 32, wherein at least one of the set of message notification objects comprises a representative icon corresponding to a message type of the at least one message notification object.

* * * * *